United States Patent
Ridealgh et al.

(10) Patent No.: US 10,167,224 B2
(45) Date of Patent: Jan. 1, 2019

(54) METHOD OF COATING GLASS

(75) Inventors: John Andrew Ridealgh, Northwich (GB); John Buckett, Knutsford (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 13/261,642

(22) PCT Filed: Oct. 18, 2011

(86) PCT No.: PCT/GB2011/052010
§ 371 (c)(1),
(2), (4) Date: Apr. 17, 2013

(87) PCT Pub. No.: WO2012/052749
PCT Pub. Date: Apr. 26, 2012

(65) Prior Publication Data
US 2013/0209828 A1  Aug. 15, 2013

(30) Foreign Application Priority Data

Oct. 22, 2010 (GB) .................................. 1017855.6

(51) Int. Cl.
*C03C 17/00* (2006.01)
*C03C 17/36* (2006.01)
*C23C 14/00* (2006.01)

(52) U.S. Cl.
CPC ........ *C03C 17/3607* (2013.01); *C03C 17/002* (2013.01); *C03C 17/36* (2013.01); *Y10T 428/12549* (2015.01)

(58) Field of Classification Search
CPC ....... C23C 14/14; C23C 14/18; C23C 14/185; C23C 16/22; C23C 16/40; C23C 16/402; C23C 16/407; C23C 16/0272
USPC ............ 204/298.27; 427/165, 248.1, 255.18, 427/255.19, 255, 395, 250
See application file for complete search history.

(56) References Cited

U.S. PATENT DOCUMENTS

| | | | | |
|---|---|---|---|---|
| 5,071,206 A | * | 12/1991 | Hood et al. | 359/360 |
| 5,505,989 A | * | 4/1996 | Jenkinson | 427/166 |
| 5,595,825 A | * | 1/1997 | Guiselin | C03C 17/36 359/360 |
| 5,745,291 A | | 4/1998 | Jenkinson | |
| 5,965,246 A | * | 10/1999 | Guiselin et al. | 428/212 |
| 6,210,784 B1 | * | 4/2001 | Rondeau | C03C 17/36 359/580 |
| 6,316,110 B1 | * | 11/2001 | Anzaki | H01J 11/10 359/359 |
| 6,602,587 B2 | | 8/2003 | Macquart et al. | |
| 6,804,048 B2 | | 10/2004 | Macquart et al. | |
| 7,037,577 B2 | | 5/2006 | Macquart et al. | |
| 7,096,692 B2 | * | 8/2006 | Greenberg et al. | 65/60.2 |
| 7,259,902 B2 | | 8/2007 | Yoshimura et al. | |
| 7,972,713 B2 | | 7/2011 | Fleury et al. | |
| 2004/0155236 A1 | * | 8/2004 | Fujisawa et al. | 257/21 |
| 2004/0241457 A1 | | 12/2004 | Macquart et al. | |
| 2008/0187692 A1 | * | 8/2008 | Roquiny | C03C 17/36 428/34 |
| 2009/0176086 A1 | | 7/2009 | Martin et al. | |
| 2010/0062245 A1 | | 3/2010 | Martin et al. | |
| 2011/0236663 A1 | | 9/2011 | Fleury et al. | |
| 2012/0010758 A1 | | 5/2012 | Martin et al. | |

FOREIGN PATENT DOCUMENTS

| | | |
|---|---|---|
| DE | 43 35 224 A1 | 4/1995 |
| EP | 0645352 A1 * | 3/1995 |
| EP | 1 577 701 A1 | 9/2005 |
| GB | 2 268 509 A | 1/1994 |
| JP | H08238710 A | 9/1996 |
| JP | 2010536707 A | 2/2010 |
| WO | 2009029466 A1 | 3/2009 |

OTHER PUBLICATIONS

Derwent Patent Family Document 1995-124535, Transparent glass substrate with multiple coatings to improve light transmission to solar factor ratio, published Mar. 1995.*

* cited by examiner

*Primary Examiner* — John J Brayton
(74) *Attorney, Agent, or Firm* — Marshall & Melhorn, LLC

(57) ABSTRACT

A process for producing a coated glass, the process comprising, a) providing a glass substrate, b) depositing a chemical vapour (CVD) deposited coating on at least one surface of the glass substrate to produce a CVD coated glass, and c) sputter depositing a further coating on the surface of the CVD coated glass, wherein the further coating comprises at least three reflective metal layers.

12 Claims, No Drawings

METHOD OF COATING GLASS

BACKGROUND OF THE INVENTION

The present invention relates to a process for producing a coated glass and coated glasses produced by the process. In particular, the present invention relates to a process for sputter coating glass with up to three or more reflective metal layers.

Glass coatings for low emissivity and/or for solar control may be deposited by physical vapour deposition processes, for example, sputtering. Sputtered low emissivity and solar control coating stacks are commonly made up of repeat sequences of substrate/base dielectric layer sequence/(Ag/dielectric layer sequence)$^n$ with each of the n dielectrics not necessarily having the same thicknesses or composition. It is becoming more common in the industry for n to equal 2 or even 3. As dielectric layers are thicker and slower to deposit than metal layers, this requires a large number of cathodes in a production coating plant.

Previously large complicated coating stacks have required extensions to coating plants to get the sufficient number of cathodes to make the different materials in sufficient number and order. Extra pumping sections have to be included in the extension to allow the multiple reactive processes to run in sequence. This is done at great expense and with huge disruption, as the coating line needs to be stopped for an extended period for engineering installation. Each new cathode and pumping section also requires the accompanying power supply, vacuum pumps, conveyor sections, services, instrumentation and integration into the control system. It is also likely to cause restructuring of the downstream logistics and possibly even new civil works or building extension. As triple (n=3) stacks become more common, these problems are likely to grow.

It is an aim of the present invention to address the problems with the prior art.

SUMMARY OF THE INVENTION

The present invention accordingly provides a process for producing a coated glass, the process comprising, a) providing a glass substrate, b) depositing a chemical vapour (CVD) deposited coating on at least one surface of the glass substrate to produce a CVD coated glass, and c) sputter depositing a further coating on the surface of the CVD coated glass, wherein the further coating comprises at least three reflective metal layers.

DETAILED DESCRIPTION OF THE INVENTION

The great advantage of this invention is that the invention allows the base coating of a multilayer coating stack to be made before sputter coating so that less cathodes are required in the sputter coating line. It also allows multiple sputtered layers to be replaced by the CVD coating. Often the stack with a CVD coating is toughenable.

If the first, or most of the first, dielectric sequence can be applied by CVD (e.g. during glass manufacturing) then a number of cathodes can be saved. This ensures that complete coating stacks may be made on plants that they previously could not be, or are faster to deposit on plants that could already make them. This also makes the films more economically viable to manufacture.

Preferably, at least one and preferably each of the reflective metal layers in the sputtered coating will comprise silver.

Usually at least one dielectric layer will be deposited between each reflective metal layer.

Usually, the CVD coating will comprise one or more layers. The layers may be selected from one or more of silicon oxide (for example silicon oxycarbide, silica, or silicon oxynitride), titanium oxide (doped or undoped), tin oxide (whether doped, e.g. with F, or undoped) and/or zinc oxide (doped or undoped). The most preferred CVD coating comprises a layer of silicon oxide overcoated with a layer of titanium oxide.

Usually, each layer of the CVD deposited coating is deposited to a thickness of between 10 and 50 nm. Preferably, the thickness of each layer of the CVD coating will be between 15 and 30 nm, more preferably 15 and 25 nm.

It is particularly beneficial if the CVD coating is deposited during the glass production process. If the glass substrate comprises a float glass substrate, conveniently the CVD coating will be deposited during the float glass deposition process either in the float bath, in the lehr or in the lehr gap. The method of CVD coating is any chemical vapour deposition technique, in particular atmospheric pressure chemical vapour deposition (e.g. online CVD as performed during the float glass deposition process).

Usually the surface of the glass substrate will be the gas side surface. Coated glass manufacturers usually prefer depositing coatings on the gas side surface (as opposed to the tin side surface for float glass) because, it is thought, that deposition on the gas side surface improves properties of the coating.

Preferably, depositing the further coating on the CVD deposited coating comprises sputter depositing at least one metallic or Ar-sputtered oxide (from ceramic target) protective layer (e.g. of NiCr, Ti, Zn, Zr, Sn, Nb, ITO, ZAO, TiO$_x$).

The dielectric layer in a sputter coating will usually be selected from TiO$_x$, Zn$_x$Sn$_y$O$_z$, ZnO, SnO$_x$, Zn$_x$Al$_y$O$_z$, AlN$_x$, SiN$_x$ or Si$_x$Al$_y$N$_z$ but could be selected from many other transparent dielectric materials.

Usually each reflective metal layer will be deposited between dielectric layers with one or more optional protective (e.g. metallic or argon-sputtered dielectric) layers. The sputter coating may comprise one or more additional reflective metal layers over 3 (e.g. 4, 5 or 6), each reflective metal layer preferably being sandwiched between dielectric and optionally metallic protective layers.

The reflective metal layer closest to the glass surface will usually be deposited on the CVD coating i.e. optically the CVD coating will usually act as the first dielectric. An optional second layer of dielectric may be applied by magnetron sputtering between the pyrolytic/CVD dielectric and sputtered metal layer.

Usually, the reflective metal layer will be deposited to a thickness of between 6 and 30 nm.

Coated glasses produced according to the first aspect of the present invention find uses in many areas of glass use.

The present invention accordingly provides, in a second aspect, a coated glass, a coated glass comprising, a) a glass substrate; b) a CVD deposited coating on at least one surface of the substrate, and c) a further sputter deposited coating on the CVD deposited coating, wherein the sputter deposited coating comprises at least three reflective metal layers.

The invention is illustrated by the following examples in which sputter coatings were deposited on CVD-coated glass.

EXAMPLES

Two sets of experiments were carried out. The first, comparative, set used a "single silver" coating stack of the general form glass/Di/Ag/Di and the second, inventive, set used a "triple silver" coating stack of the form glass/Di/Ag/Di/Ag/Di/Ag/Di. In both stacks "Di" stands for a dielectric layer that can be made up from one or several layers of dielectric material. Examples include, but are not limited to, oxides or nitrides of Ti, Zn, Sn, Al, Si, Zr or mixtures of these.

All substrates were prepared in the same way by passing them through a "Bentler" flat bed washing machine. The washing machine uses heated water and a multistage washing process finishing with pure water and an air-knife drier.

All samples were coated with the same coating stack in the same coating run. The coating plant was a "Von Ardenne GC 120 V/CSE" equipped with 3400 cm$^2$ WSM and SDM magnetrons hooked up to DC and MF Power supplies. DC supplies were used when sputtering in pure Ar.

For Comparative Example 1 the coating stack was based on the following design:

Glass/30 ZnSnO$_x$/5 ZnO/12 Ag/1.5 NiCrO$_x$/3 ZAO/10 ZnSnO$_x$/25 SiN (with all thickness in nm). This stack was used on a plain glass substrate. A further Comparative Example 2 consisted of a stack made using CVD coated glass of Pilkington Activ™ CVD double layer of Glass/25 nm SiO$_2$/15 nm TiO$_2$. For Comparative Example 2, the optical thickness would have been less than that of the all-sputtered sample, so 5 nm of ZnSnO$_x$ was added by sputtering to complete the base dielectric.

The results were as follows:

TABLE 1

| Substrate Type | AD Rs Ω/□ | HT Rs Ω/□ | T$_{vis}$ AD % | T$_{vis}$ HT % | Specular-Haze | Comment |
| --- | --- | --- | --- | --- | --- | --- |
| Comparative Example 1 | 8.1 | 4.7 | 80.2 | 85.1 | 5+ | Very hazy - unacceptably high |
| Comparative Example 2 | 11.8 | 10.9 | 76.1 | 77.1 | 0-1 | Low haze |

AD = as deposited;
HT = after heat treatment

Specular-haze (sometimes called red-haze or white-haze to describe a certain colour cast associated with it) may be considered as a milky or finely dappled spot pattern covering the majority of the coated glass surface. As the name suggests its nature appears to be predominantly, but not completely, specular rather than diffuse. This means the patterns can frequently have a strong angular component to their behaviour i.e. if the illumination and observer's viewing angle is at normal incidence the specular-haze may be strongly apparent whereas if the illumination moves to a very different angle, such as 45°, it may not be. After heating, and after allowing the glass to cool is to room temperature, the coated samples were appraised with the naked eye by illumination with a powerful lamp against a dark background. The level of specular-haze is numerically ranked against other samples and experience. A sample showing no specular-haze at all would be ranked at zero. Although it is common to get non-zero specular-haze scores this is not a problem at low value as long as the haze is evenly and randomly distributed. If it is concentrated into patterns, or has regions of very high haze, this becomes visually distracting and is unacceptable. These localised and/or non-uniform patterns in the haze may take the form of patches, spots or blotches.

The stack with the all sputtered base dielectric has a good drop in sheet resistance and increase in visible transmittance, but the level of specular-haze is totally unacceptable. The Activ™ CVD coating also shows a drop in sheet resistance and an increase in transmittance, albeit at higher values. However the Activ-based film does not develop unacceptable haze—in fact haze is very low. Overall the Pilkington Activ™ substrate gives acceptable performance. It does this while removing the need to deposit 25 nm of base dielectric—roughly 30% of the total dielectric thickness of the stack. For a single silver coating stack this means that more cathodes can be used for other layers in the stack allowing a higher line speed and therefore higher output giving more profitable use of fixed assets.

For the Examples of the invention the coating stack was based on the same materials and generally the same sequence as the Comparative Examples, but the sequence was repeated to make a triple silver coating stack of the form glass/Di/Ag/Di/Ag/Di/Ag/Di. In this case all the bottom dielectric layers were completely replaced by Pilkington Activ™. Minor variations on the coating stack design were made in different experiments. These were as shown in the following table:

TABLE 2

| Sample N°. | Design (thicknesses in nm) |
| --- | --- |
| Example 1 | Pilkington Activ ™/12 Ag/1.5 NiCrO$_x$/5 ZAO/20 ZnSnO$_x$/30 SiN/4 ZnO/9 Ag/1.5 NiCrO$_x$/5 ZAO/16 ZnSnO$_x$/33 SiN/4 ZnO/12.5 Ag/1.5 NiCrO$_x$/5 ZAO/10 ZnSnO$_x$/16 SiN |
| Example 2 | Pilkington Activ ™/12 Ag/1.5 NiCrO$_x$/5 ZAO/50 ZnSnO$_x$/4 ZnO/9 Ag/1.5 NiCrO$_x$/5 ZAO/16 ZnSnO$_x$/33 SiN/4 ZnO/12.5 Ag/1.5 NiCrO$_x$/5 ZAO/10 ZnSnO$_x$/16 SiN |
| Example 3 | Pilkington Activ ™/12 Ag/5 ZAO/50 ZnSnO$_x$/4 ZnO/9 Ag/5 ZAO/16 ZnSnO$_x$/33 SiN/4 ZnO/12.5 Ag/5 ZAO/10 ZnSnO$_x$/16 SiN |

These stacks resulted in the following performance data:

TABLE 3

| Sample Number | AD Rs Ω/□ | HT Rs Ω/□ | T$_{vis}$ AD % | T$_{vis}$ HT % | Specular-Haze | Comment |
| --- | --- | --- | --- | --- | --- | --- |
| Example 1 | 2.87 | 1.87 | 48 | 55.7 | 5 | |
| Example 2 | 2.94 | 1.94 | 48.2 | 55.5 | 4-5 | |
| Example 3 | 2.63 | 1.64 | 61.7 | 68.1 | 5 | Acceptable haze in day light |

Although haze levels were high they were acceptable when viewed in daylight. The CVD coating acted as replacement for 3 separate coating layers from the design. Since some of these layers would require different reactive gases a gas pumping section has also been removed. A real coating plant using the CVD underlayer would likely have saved at least 7 cathode positions.

The deposition conditions used were as follows, sample traverse speed was varied to give appropriate thickness for each layer in the coating stack:

TABLE 4

| Material | Si—10 wt % Al | Zn—50 wt % Sn | Zn—2 wt % Al | Ag | Ni—20 wt % Cr | ZnO—3 wt % Al$_2$O$_3$ |
| --- | --- | --- | --- | --- | --- | --- |
| Power kW | 15 | 10 | 14 | 5 | 5 | 4 |
| Pressure × 10$^{-3}$ mBar | 3.8/4.0* | 5.1 | 3.4 | 3.4 | 3.4 | 3.3 |
| Ar % | 62/57* | 42 | 26 | 100 | 82 | 100 |
| O$_2$ % | — | 58 | 74 | — | 18 | — |
| N$_2$ % | 38/43* | — | — | — | — | — |

*2$^{nd}$ figure for SiN layer furthest away from substrate.

The invention claimed is:

1. A process of producing a heat treated coated glass comprising three or more silver metal reflective layers, said heat treated coated glass comprising at least, in order:
a glass layer; a first dielectric layer; a first silver layer; a second dielectric layer; a second silver layer; a third dielectric layer; a third silver layer; a fourth dielectric layer, the process comprising the steps of:
   a) providing a float glass substrate by a float glass deposition process,
   b) depositing by chemical vapour deposition (CVD) during the float glass deposition process a coating on at least one surface of the glass substrate to produce a CVD coating, said CVD coating providing the first dielectric layer and wherein, said first dielectric layer consists solely of CVD coating, said first dielectric layer comprising:
      i) a CVD deposited layer of silicon oxide of thickness 10 to 50 nm overcoated directly with
      ii) a second consecutive CVD deposited layer of titanium oxide of thickness 10 to 50 nm, wherein both the silicon oxide and titanium oxide are deposited on the glass substrate during the float glass deposition process; and
   c) sputter depositing a further coating onto the surface of the CVD coated float glass, said further sputter deposited coating comprising the three or more reflective silver metal layers each separated by the second, third and fourth dielectric layers respectively, wherein
      each of the second, third and fourth dielectric layers comprise a layer of zinc stannate ($ZnSnO_x$), and
      each layer of zinc stannate comprises between 27% and 85% of the total thickness of the second, third and fourth dielectric layers; and
   d) heat treating the float glass substrate with combined CVD and sputtered coating to toughen the coated glass and to achieve a coated toughened glass, and wherein the light transmission of the heat treated coated glass is increased by 10% compared to the light transmission of the coated glass before heat treatment; and
      wherein the sheet resistance of the heat treated coated glass is decreased by at least 34% compared with the sheet resistance of the coated glass before heat treatment.

2. The process as claimed in claim 1, wherein the float glass substrate has a tin side surface and a gas side surface, and the coating is applied on the gas side surface of the glass substrate.

3. The process as claimed in claim 1, wherein depositing the further coating comprises sputter depositing at least one metallic protective layer.

4. The process as claimed in claim 1, wherein a or each reflective metal layer is deposited to a thickness of between 6 and 30 nm.

5. The process according to claim 1, wherein each of the first and second CVD deposited layer is deposited to a thickness of between 15 and 30 nm.

6. The process according to claim 1, wherein each of the first and second CVD deposited layer is deposited to a thickness of between 15 and 25 nm.

7. The process as claimed in claim 1, wherein depositing the further coating comprises sputter depositing directly atop the silver metal reflective layers a protective layer, said protective layer comprising material selected from the group consisting of: NiCrOx/ZAO or ZAO.

8. The process as claimed in claim 1, wherein the silver metal reflective layer closest to the glass surface is sputter deposited directly onto the CVD coating acting as first dielectric and which comprises silicon oxide and titanium oxide.

9. A process of producing a heat treated coated glass comprising three or more silver metal reflective layers, said process comprising the steps of:
   a) providing a float glass substrate by a float glass deposition process,
   b) depositing a chemical vapour deposited (CVD) coating on at least one surface of the float glass substrate during the float glass deposition process to produce a CVD coated glass,
   said CVD coating comprising:
      i) a first CVD deposited layer of silicon oxide overcoated directly with
      ii) a second CVD deposited layer of titanium oxide; each of the first and second CVD deposited layers deposited to a thickness of between 10 and 50 nm and wherein both the silicon oxide and titanium oxide are deposited on the glass substrate during the float glass deposition process, and further
   c) depositing by sputtering only a further coating on the surface of the CVD coated glass, the further sputtered coating comprising:
   three or more individual reflective silver metal layers deposited to a thickness of between 6 and 30 nm; and
   at least one dielectric layer deposited on each reflective silver metal layer;
   wherein each dielectric layer deposited on each reflective silver metal layer comprises a layer of zinc stannate ($ZnSnO_x$), and wherein each layer of zinc stannate comprises between 27% and 85% of the total thickness of each dielectric layer deposited on each reflective silver metal layer; and further
   d) heat treating the float glass substrate with CVD coating and further coating to toughen the coated glass and achieve a toughened coated glass, and wherein once heat treated the light transmission of the heat treated coated glass is increased by 10% compared to the light transmission of the coated glass before heat treatment; and
   wherein the sheet resistance of the heat treated coated glass is decreased by at least 34% compared with the sheet resistance of the coated glass before heat treatment.

10. A process of producing a heat treated coated glass comprising three or more silver metal reflective layers, said heat treated coated glass comprising at least in order:
a glass layer; a first dielectric layer; a first silver layer; a second dielectric layer; a second silver layer; a third dielectric layer; a third silver layer; a fourth dielectric layer, the process comprising the steps of:
   a) providing a float glass substrate by a float glass deposition process,
   b) depositing by chemical vapour deposition (CVD) only on at least one surface of the glass substrate during the float glass deposition process the first dielectric layer solely by chemical vapour deposition followed by,
   c) sputter depositing onto the surface of the CVD coated float glass, the three or more reflective silver metal layers each separated by the second, third and fourth dielectric layers respectively; and
   d) heat treating the float glass substrate to toughen the coated glass wherein the light transmission of the heat treated coated glass is increased by 10% compared to the light transmission of the coated glass before heat treatment; and wherein the sheet resistance of the heat treated coated glass is decreased by at least 34% compared with the sheet resistance of the coated glass before heat treatment.

11. The process as claimed in claim 10, wherein each layer of the CVD coating is deposited to a thickness of between 10 and 50 nm.

12. The process as claimed in claim 10, wherein the dielectric layer or layers comprise $AlN_x$, $SiN_x$, $Si_xAl_yN_z$, $Zn_xSn_yO_z$, ZnO, $SnO_x$, $TiO_x$ and $Zn_xAl_yOz$ or mixtures thereof.

* * * * *